US008448147B2

(12) United States Patent
Raz et al.

(10) Patent No.: US 8,448,147 B2
(45) Date of Patent: May 21, 2013

(54) HETEROGENIC COVERAGE ANALYSIS

(75) Inventors: Orna Raz, Haifa (IL); Eitan Farchi, Pardes-Hana (IL); Yochai Ben-Chaim, Haifa (IL); Hana Chockler, Haifa (IL); Lawrence Blount, Tucson, AZ (US); Aviad Zlotnick, Mitzpeh Netofa (IL)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 12/705,645

(22) Filed: Feb. 15, 2010

(65) Prior Publication Data

US 2011/0202904 A1 Aug. 18, 2011

(51) Int. Cl.
*G06F 9/44* (2006.01)
*G06F 11/00* (2006.01)

(52) U.S. Cl.
USPC ........... 717/130; 717/109; 717/127; 717/131; 714/34; 714/37

(58) Field of Classification Search
None
See application file for complete search history.

(56) References Cited

U.S. PATENT DOCUMENTS

| | | | | |
|---|---|---|---|---|
| 5,724,504 A * | 3/1998 | Aharon et al. | ................... | 714/33 |
| 5,909,577 A * | 6/1999 | Devanbu | ................... | 717/127 |
| 6,076,173 A * | 6/2000 | Kim et al. | ................... | 714/25 |
| 6,192,511 B1 * | 2/2001 | Johnston et al. | ................... | 717/109 |
| 6,356,858 B1 * | 3/2002 | Malka et al. | ................... | 702/186 |
| 6,779,135 B1 * | 8/2004 | Ur et al. | ................... | 714/38.13 |
| 6,895,578 B1 * | 5/2005 | Kolawa et al. | ................... | 717/130 |
| 7,100,152 B1 * | 8/2006 | Birum et al. | ................... | 717/131 |
| 7,779,374 B1 * | 8/2010 | Hamid et al. | ................... | 716/136 |
| 2003/0093716 A1 * | 5/2003 | Farchi et al. | ................... | 714/34 |
| 2003/0188298 A1 * | 10/2003 | Shaposhnick | ................... | 717/141 |
| 2004/0249618 A1 * | 12/2004 | Fine et al. | ................... | 703/2 |
| 2005/0229165 A1 * | 10/2005 | Ma et al. | ................... | 717/130 |
| 2005/0278576 A1 * | 12/2005 | Hekmatpour | ................... | 714/37 |
| 2006/0070048 A1 * | 3/2006 | Li et al. | ................... | 717/144 |
| 2006/0294503 A1 * | 12/2006 | Henderson et al. | ................... | 717/131 |
| 2007/0010975 A1 * | 1/2007 | Fine et al. | ................... | 703/2 |
| 2007/0168789 A1 * | 7/2007 | Udell | ................... | 714/724 |
| 2008/0092123 A1 * | 4/2008 | Davison et al. | ................... | 717/128 |
| 2008/0148247 A1 * | 6/2008 | Galler et al. | ................... | 717/154 |
| 2009/0249298 A1 | 10/2009 | Blount et al. | | |
| 2009/0249299 A1 | 10/2009 | Farchi et al. | | |
| 2010/0131930 A1 * | 5/2010 | Ben-Chaim et al. | ................... | 717/127 |

OTHER PUBLICATIONS

M. A. Vouk, "Using Reliability Models During Testing With Non-Operational Profiles", [Online], Sep. 1992, pp. 1-9, [Retrieved from Internet on Jan. 2, 2013], <http://citeseerx.ist.psu.edu/viewdoc/download?doi=10.1.1.47.8863&rep=rep1&type=pdf>.*

Dick Hamlet, "Foundations of Software Testing: Dependability Theory", [Online], ACM 1994, pp. 1-12, [Retrieved from Internet on Jan. 2, 2013], <http://web.cecs.pdx.edu/~hamlet/found.pdf>.*

(Continued)

*Primary Examiner* — Thuy Dao
*Assistant Examiner* — Ziaul A Chowdhury
(74) *Attorney, Agent, or Firm* — Ziv Glazberg; Glazberg & Aplbaum Co.

(57) ABSTRACT

A coverage analysis tool may determine coverage in respect to heterogeneous coverage tasks associated with different hierarchy levels of a tasks hierarchy. The coverage analysis tool may iteratively refine coverage tasks to determine coverage of sub-tasks. In some cases, coverage tasks may be unrefined in order to reduce overhead of coverage analysis in performance of the software under test, such that the software under test may perform in an essentially similar manner as in non-testing mode.

21 Claims, 4 Drawing Sheets

OTHER PUBLICATIONS

Saurabh Sinha et al., "Analysis and Testing of Programs with Exception Handling Constructs", [Online], Year 2000, pp. 1-34, [Retrieved form Internet on Jan. 2, 2013], <http://smartech.gatech.edu/bitstream/handle/1853/6581/GIT-CC-00-04.pdf>.*

Jungsup Oh et al., "Transition Coverage Testing for Simulink/Stateflow Models Using Messy Genetic Algorithms", [Online], ACM 2011, pp. 1851-1858, <http://crest.cs.ucl.ac.uk/fileadmin/crest/sebasepaper/OhHY11.pdf>.*

* cited by examiner

HETEROGENIC COVERAGE ANALYSIS

BACKGROUND

The present disclosure relates to coverage analysis of computer programs in general, and to code coverage analysis of source code in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in developing a computerized device. Many developers of computerized devices devote a significant portion, such as 70%, of the development cycle to discover erroneous behaviors of the software employing the computerized device.

In order to determine that a testing phase is of a relatively high quality, coverage analysis may be utilized. By analyzing coverage of tests in respect to coverage tasks, a developer may be informed which aspects of the software have been tested and which aspects have not been operated by the tests. Various different coverage metrics may be employed, such as for example, code coverage metrics and data coverage metrics. Code coverage metrics are associated with portions of the software, and are indicative of operation of specific portions of the code, such as for example, execution of a line, a function, a code of a file, a code of a file in a directory, a code associated with an object, a code associated with a method of an object or the like.

The developer or any other user interested in testing the software, such as for example a member of a Quality Assurance (QA) team, may utilize a coverage metric to determine which aspects of the software have been tested sufficiently and which aspects have not.

BRIEF SUMMARY OF THE INVENTION

One exemplary embodiment of the disclosed subject matter is a computerized apparatus for determining coverage of testing in respect to a device, the device is associated with a set of coverage tasks and a coverage task hierarchy, the computerized apparatus having a processor, the computerized apparatus comprising: a receiver configured to receive a plurality of coverage tasks of the set of coverage tasks, the plurality of coverage tasks comprises a first coverage task and a second coverage task, the first coverage task and the second coverage task are associated with different hierarchies of the coverage task hierarchy; and a coverage determinator configured to determine coverage by a test of the device of the plurality of coverage tasks received by the receiver.

Another exemplary embodiment of the disclosed subject matter is a method in a computerized environment for determining coverage of testing in respect to a device, the device is associated with a set of coverage tasks and a coverage task hierarchy, the method comprising: obtaining a plurality of coverage tasks of the set of coverage tasks, the plurality of coverage tasks comprises a first coverage task and a second coverage task, the first coverage task and the second coverage task are associated with different hierarchies of the coverage task hierarchy; modifying the device to indicate coverage of the plurality of coverage tasks by a test; and determining coverage by the test of the device of the plurality of coverage tasks; whereby the device is transformed to indicate coverage of at least the first coverage task and the second coverage task.

Yet another exemplary embodiment of the disclosed subject matter is a computer program product for determining coverage of testing in respect to a device, the device is associated with a set of coverage tasks and a coverage task hierarchy, the product comprising: a computer readable medium; a first program instruction for obtaining a plurality of coverage tasks of the set of coverage tasks, the plurality of coverage tasks comprises a first coverage task and a second coverage task, the first coverage task and the second coverage task are associated with different hierarchies of the coverage task hierarchy; a second program instruction for modifying the device to indicate coverage of the plurality of coverage tasks by a test; a third program instruction for determining coverage by the test of the device of the plurality of coverage tasks; and wherein the first, second and third program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
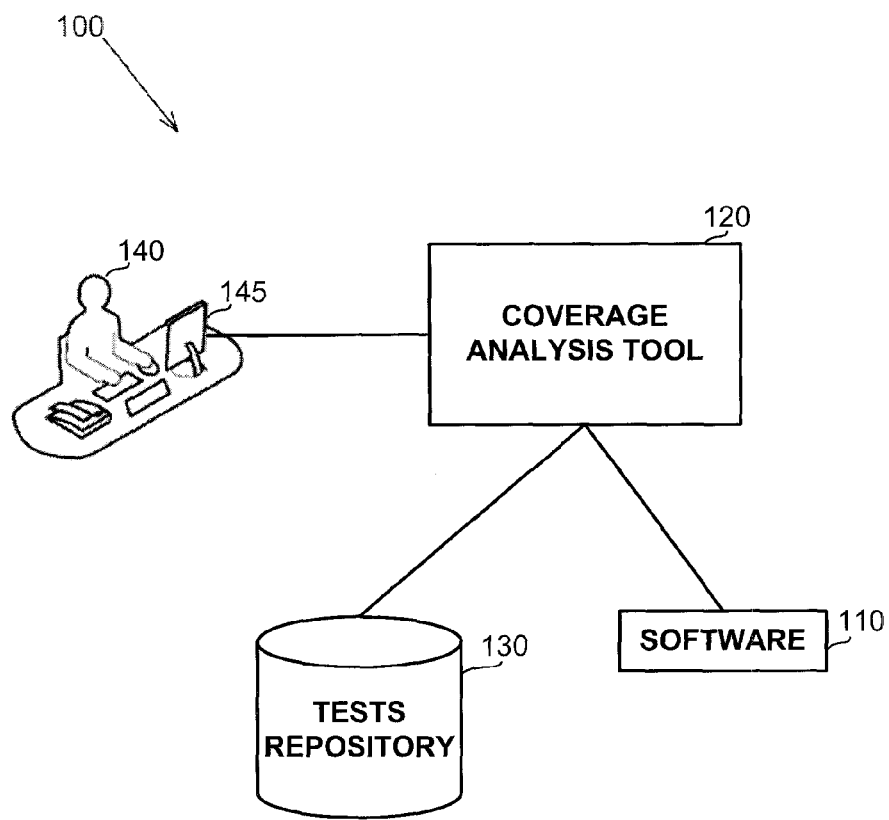
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is performing coverage analysis for computer programs, without substantially affecting performance of the computer programs. Coverage analysis may involve modification of the computer programs, such as for example by instrumentation. Such modification may affect performance of the computer programs when executed. Another technical problem dealt with by the disclosed subject matter is to enable coverage analysis in respect to a set of coverage tasks without requiring determining coverage in respect to all the coverage tasks of the set at the same time.

One technical solution is to utilize hierarchy of the set of coverage tasks. The hierarchy may define relations between coverage tasks such that if a first coverage task is covered, a second coverage task is also covered, or such that if the second coverage task is not covered, the first coverage task is also not covered. Another technical solution is to determine coverage based on a portion of the coverage tasks selected from the hierarchy. Yet another technical solution is to modify the selection of coverage tasks in response to coverage determination based on previous selections. Yet another technical solution is to replace a coverage task that was covered by associated coverage sub-tasks, based on the hierarchy. Yet another technical solution is to replace the coverage task in response to a coverage result of higher level coverage tasks, such as an immediate predecessor coverage task of the coverage task. Yet another technical solution is to traverse the hierarchy based on predetermined traversal strategy such as for example Breadth-First Search (BFS) or Depth-First Search (DFS).

One technical effect of utilizing the disclosed subject matter is enabling selective instrumentation of the computer programs based on a portion of the coverage tasks. The selective instrumentation may enable coverage analysis while reducing overhead associated with coverage analysis. Another technical effect of utilizing the disclosed subject matter is to enable identification of high-level coverage tasks not covered, prior to analyzing a multitude of coverage sub-tasks.

Referring now to FIG. 1 showing a computerized environment in which the disclosed subject matter is used, in accordance with some exemplary embodiments of the subject matter. A computerized environment 100 may comprise a coverage analysis tool 120. The coverage analysis tool 120 may be implemented in software, hardware, firmware, a combination thereof or the like.

The coverage analysis tool 120 may determine coverage of one or more tests, such as stored in a test repository 130, in respect to a software 110. The software 110 is also referred to a Software Under Test (SUT). The software 110 may be any type of software. The source code of the software 110 may or may not be available to the coverage analysis tool 120. The execution file of the software 110 may be available to the coverage analysis tool 120 with or without debugging information. The software 110 may also refer to firmware or other type of program.

A user 140, such as a member of a QA team, a developer or the like, may utilize the coverage analysis tool 120 using a terminal 145, such as a laptop, a personal computer, or the like.

In some exemplary embodiments, the user 140 may provide the coverage analysis tool 120 with coverage tasks. In some exemplary embodiments, the coverage analysis tool 120 may determine coverage tasks based on rules, commands, parameters and the like. For example, code coverage tasks may be automatically determined based on source code, debugging information, executable file or the like.

In some exemplary embodiments, the coverage analysis tool 120 may employ a portion of the tests of the tests repository 130 until sufficient coverage is determined. In some exemplary embodiments, a portion of the tests may be executed several times, in respect to different sets of coverage tasks.

Figure 2:
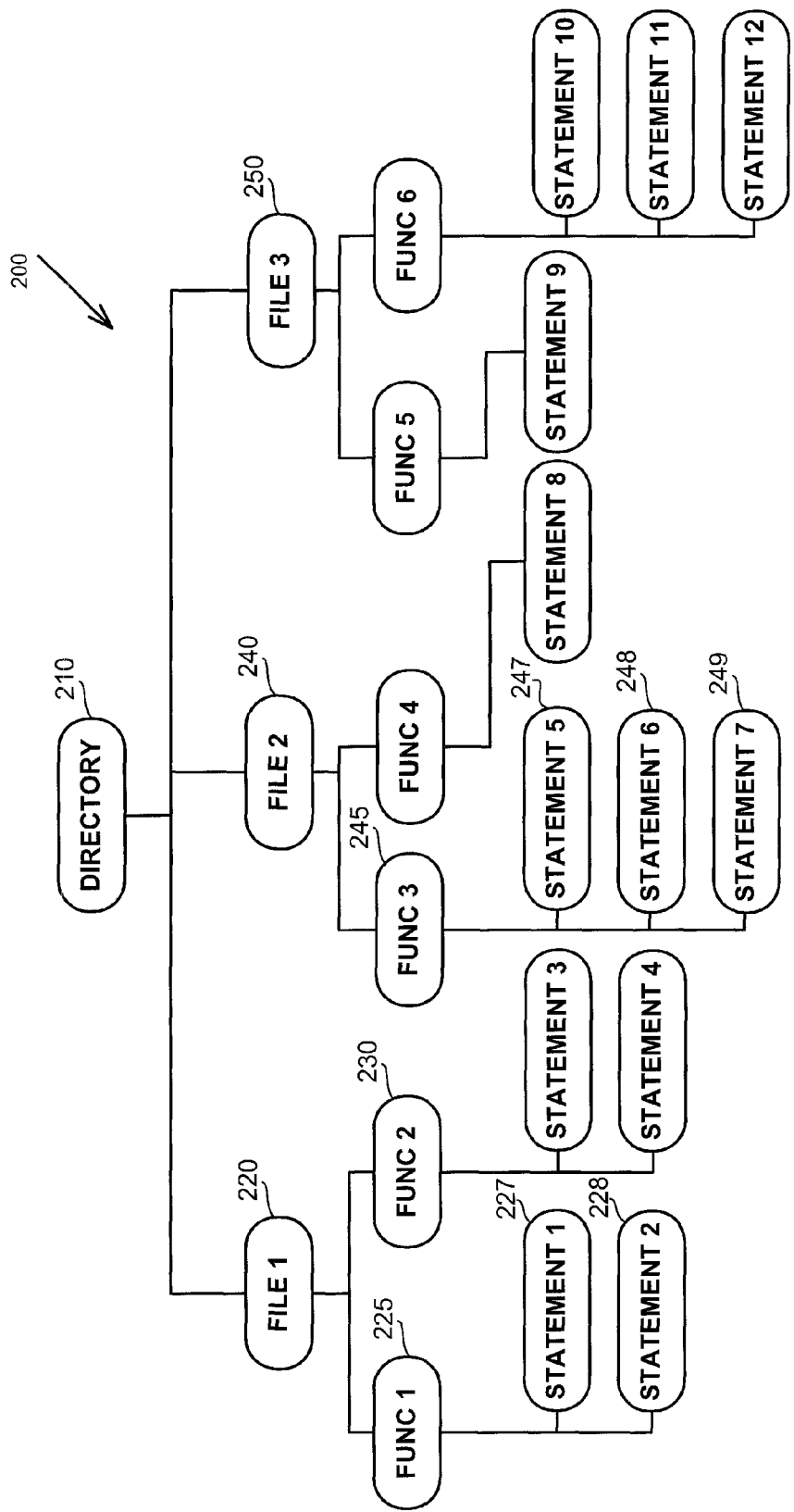
FIG. 2 shows a code coverage tasks hierarchy, in accordance with some exemplary embodiments of the disclosed subject matter.

Referring now to FIG. 2 showing a code coverage tasks hierarchy, in accordance with some exemplary embodiments of the disclosed subject matter. A code coverage hierarchy 200 may comprise coverage tasks. The coverage tasks may comprise of directory coverage tasks, such as 210, file coverage tasks, such as 220, function coverage tasks, such as 225, statement coverage tasks, such as 247, or the like.

A coverage task may have successor tasks, also referred to as sub-tasks, such that in case the coverage task is not covered, the successor tasks are not covered as well. For example, in case "FILE 2" coverage task 240 is not covered, all function coverage tasks, "FUNC 3" 245 and "FUNC 4" 250 that are successor coverage tasks of 240, are not covered as well. In a similar manner, statement coverage tasks, such as 247, 248, 249 are also not covered. In case the "FUNC 3" coverage task 245 is covered, then the "FILE 2" coverage task 240 is also covered.

In some exemplary embodiments, a coverage analysis tool, such as 120 of FIG. 1, may determine coverage in respect to a portion of the coverage tasks in the hierarchy 200, such as for example "FILE 1" coverage task 220, "FUNC 3" coverage tasks 245, "FUNC 4" coverage tasks 250 and "FILE 3" coverage task 260. In some exemplary embodiments, the coverage analysis tool may determine coverage in respect to coverage tasks of different hierarchy level, also referred to as heterogeneous coverage tasks. In some exemplary embodiments, in response to determining that a coverage task is covered, the coverage analysis tool may determine coverage of sub-tasks. For example, instead of determining coverage in respect to file coverage task 245, the coverage analysis tool may determine coverage in respect to statement coverage tasks 247, 248 and 249.

In some exemplary embodiments, the coverage analysis tool may replace a coverage task by its sub-task based on predetermined rules, heuristics or the like. For example, a file coverage task, such as 220, 240 or 260 may be replaced by its successor in case only in case a predetermined portion of the file coverage tasks associated with the directory coverage task 210 are covered. For example, only in case more than sixty percent (60%) of the file coverage tasks are covered, any of the file coverage tasks may be substituted by its successors.

In some exemplary embodiments, the coverage analysis tool may modify the set of coverage tasks being analyzed based on traversal strategy such as DFS, BFS or the like. Exemplifying DFS traversal strategy, the coverage analysis tool may initially determine coverage in respect to the set {210}, then in respect to the set {220, 240, 260}, then in respect to the set {225, 230, 240, 260}, then in respect to the set {227, 228, 230, 240, 260} and so forth.

In some exemplary embodiments, the coverage analysis tool may replace one or more coverage tasks that were covered with higher level coverage tasks. For example, in response to determining coverage of the statement coverage tasks 247, 248, 249, a higher level coverage task may be analyzed in successive coverage analysis, such as for example, function coverage task 245, file coverage task 240, directory coverage task 210 or the like. In some exemplary embodiment, the covered coverage task may be removed altogether. By removing or by replacing the covered coverage task with higher-level coverage tasks, there may be a reduction in the affect of instrumentation of the coverage tasks on the SUT. By replacing the coverage task instead of removing an added value may be achieved of being informed of coverage of additional tests of the SUT with respect to an aspect of the SUT associated with the covered coverage task.

In some exemplary embodiments, the hierarchy of coverage tasks may be based on syntactic representation of the SUT, such as for example depicted in FIG. 2. In other exemplary embodiments, the hierarchy may be determined based on different aspects of the SUT, such as for example functions dependencies as depicted by a call graph, object hierarchy associated with an object-oriented design, or the like.

Figure 3:
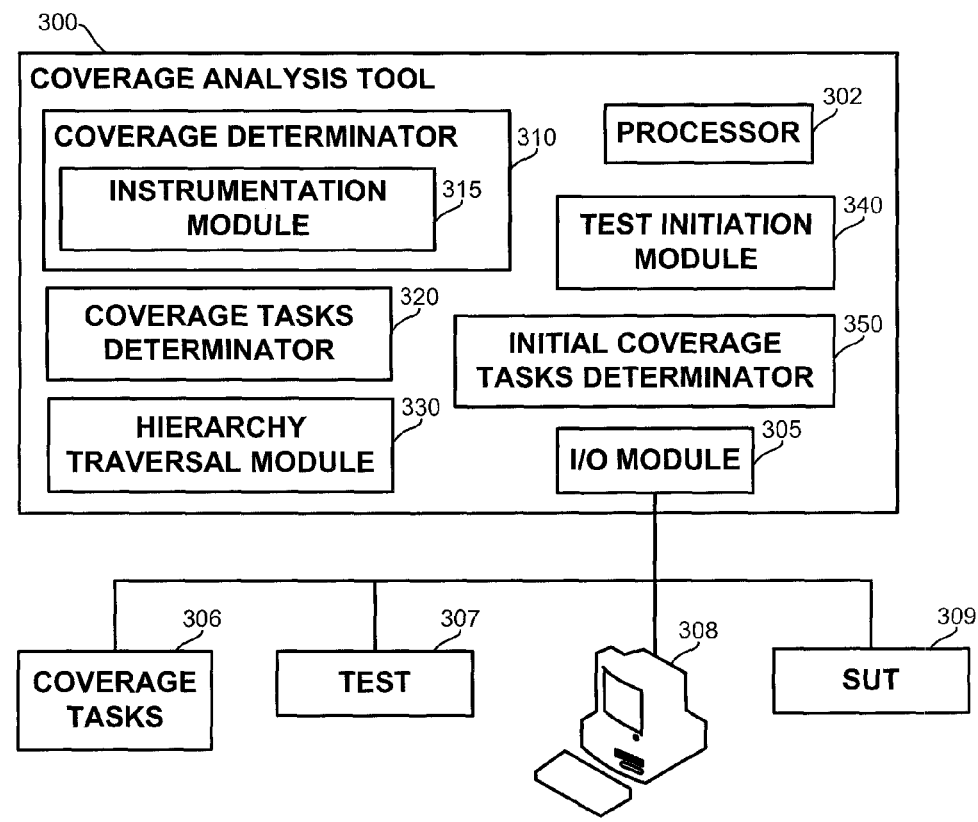
FIG. 3 shows a block diagram of a coverage analysis tool, in accordance with some exemplary embodiments of the disclosed subject matter.

Referring now to FIG. 3 showing a block diagram of a coverage analysis tool, in accordance with some exemplary embodiments of the disclosed subject matter. A coverage analysis tool 300, such as 120 of FIG. 1, may comprise a coverage determinator 310.

In some exemplary embodiments, the coverage determinator 310 may be configured to determine coverage of a test 307 in respect to a SUT 309 and in respect of a coverage task. The coverage determinator 310 may modify the SUT 309 based on the coverage task. In some exemplary embodiments, the coverage determinator 310 may comprise an instrumentation module 315 operative to instrument the SUT 309 with commands that indicate performance of a predetermined behavior depicted by the coverage task, such as for example a function call, an execution of a statement or the like.

In some exemplary embodiments, the coverage analysis tool 300 may comprise an initial coverage tasks determinator 350 to determine an initial set of coverage tasks to analyze. In some exemplary embodiments, the coverage analysis tool 300 may be configured to iteratively utilize the coverage determinator 310 in respect to different coverage tasks, such as for example starting from the coverage tasks determined by the initial coverage tasks determinator 350.

In some exemplary embodiments, the coverage analysis tool 300 may comprise a coverage tasks determinator 320 configured to determine a set of coverage tasks based on a previous set of coverage tasks. The coverage tasks determinator 320 may utilize a hierarchy traversal module 330 to determine the set of coverage tasks based on a traversal strategy of a hierarchy such as 200 of FIG. 2. The hierarchy traversal module 330 may be in some exemplary embodiments a DFS module (not shown) utilizing DFS traversal strategy, a BFS module (not shown) utilizing BFS traversal strategy or the like. The hierarchy traversal module 330 may provide other traversal strategies to traverse the hierarchy. In some exemplary embodiments, the coverage tasks determinator 320 may determine the set of coverage tasks based on successful or unsuccessful coverage of a coverage task of the previous set of coverage tasks.

In some exemplary embodiments, the coverage analysis tool 300 may comprise a test initiation module 340 configured to initiate a test 307 in respect to the SUT 309. In some exemplary embodiments, the test initiation module 340 may execute a modified version of the SUT 309, such as for example an instrumented version of the SUT 309 provided by the instrumentation module 315. The coverage determinator 310 may determine coverage of coverage tasks based on the execution of the test 307 as is known in the art.

In some exemplary embodiments, the coverage analysis tool 300 may comprise a processor 302. The processor 302 may be a Central Processing Unit (CPU), a microprocessor, an electronic circuit, an Integrated Circuit (IC) or the like. The processor 302 may be utilized to perform computations required by the coverage analysis tool 300 or any of it sub-components.

In some exemplary embodiments, the coverage analysis tool 300 may comprise an Input/Output (I/O) module 305. The I/O module 305 may provide an output to a user, such as 140 of FIG. 1. The I/O module 305 may provide output indicating successful or unsuccessful coverage of a coverage task. The I/O module 305 may provide the output to a terminal 308, such as 145 of FIG. 1. The I/O module 305 may receive the SUT 309, such as by receiving the source code of the SUT 309, the executable of the SUT 309, a link a similar product of the SUT 309 or the like. The I/O module 305 may receive coverage tasks 306. The coverage tasks 306 may be an initial set of coverage tasks. The coverage tasks 306 may be a refined set of coverage tasks in response to coverage determination in respect to a previous set of coverage tasks. The I/O module 305 may receive a test 307, such as for example from a test repository 130 of FIG. 1.

Figure 4:
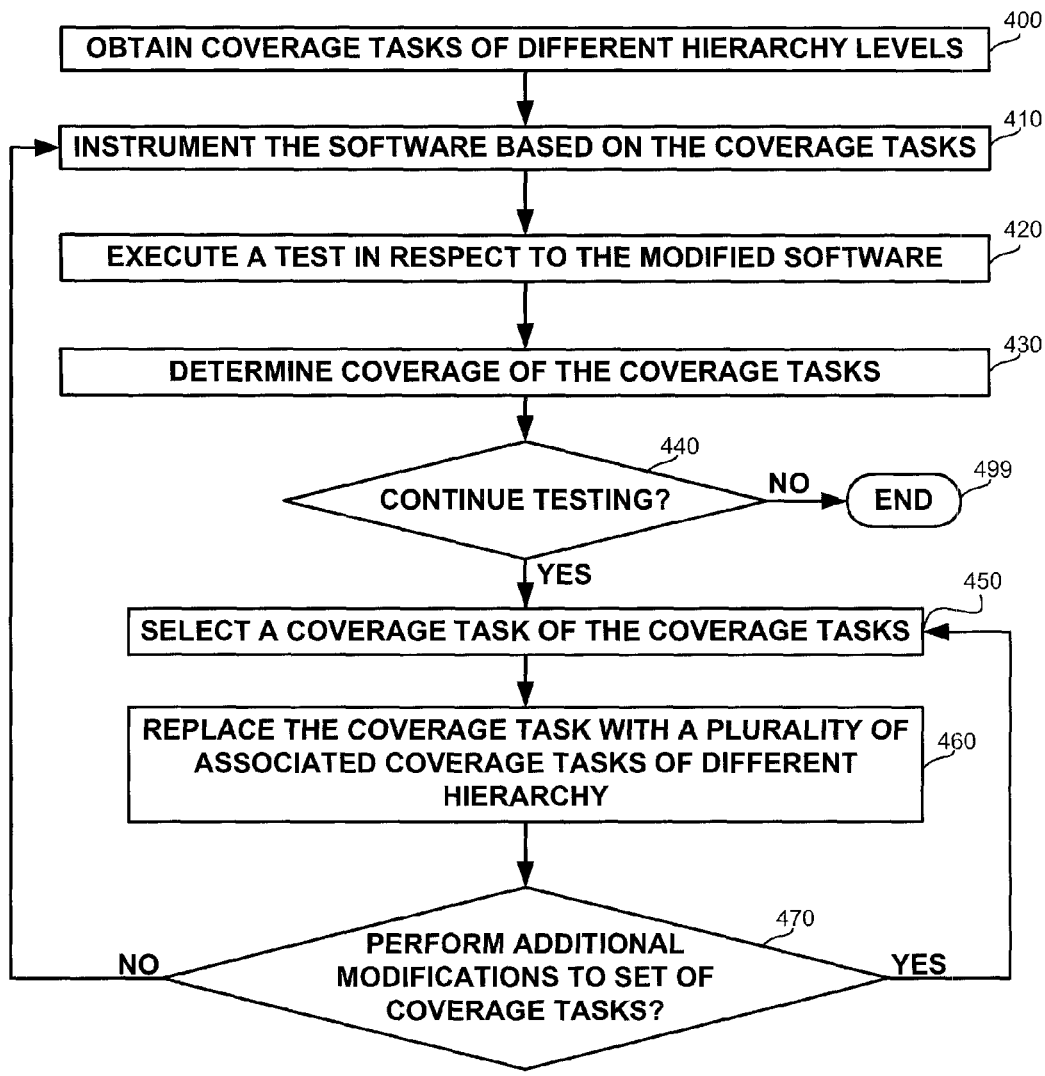
FIG. 4 shows a flowchart diagram of a method, in accordance with some exemplary embodiments of the disclosed subject matter.

Referring now to FIG. 4 showing a flowchart diagram of a method in accordance with some exemplary embodiments of the disclosed subject matter.

In step 400, initial coverage tasks are obtained. The coverage tasks may be obtained by an initial coverage tasks determinator, such as 350 of FIG. 3, by a receiver, such as 305 of FIG. 3, or the like. The coverage tasks may have different hierarchy levels, such as the coverage tasks may comprise both a file coverage task and a statement coverage task.

In step 410, instrumentation of the SUT may be performed. The instrumentation may be performed in respect to the coverage tasks obtained in step 400. The instrumentation may be performed by an instrumentation module, such as 315 of FIG. 3.

In step 420, a test may be executed in respect to the instrumented SUT. The test may be executed by a test initiation module, such as 340 of FIG. 3.

In step 430, coverage in respect to the coverage tasks may be determined. The determination may be performed by a coverage determinator, such as 310 of FIG. 3. It will be noted that in some exemplary embodiments, steps 420 and 430 may be performed several times in respect to different tests or in respect to a same non-deterministic test.

In step 440, a determination whether or not to continue testing may be performed. The determination may be affected by elapsed time of testing, number of executed tests, remaining tests, user preferences or the like. In case a determination to end testing is determined, step 499 may be performed and the method may end. Otherwise, step 450 may be performed.

In step 450, a coverage task may be selected from the coverage tasks utilized in step 410.

In step 460, the selected coverage task may be replaced by a plurality of associated coverage tasks of different hierarchy, such as for example immediate successor of the selected coverage task in respect to a hierarchy or immediate predecessor of the selected coverage task.

In some exemplary embodiments, a selection in step 450 and the replacement in step 460 may be performed a coverage task determinator, such as 320 of FIG. 3. Steps 450 and 460 may be performed based on a traversal strategy of the hierarchy, such as a DFS or BFS traversal.

In some exemplary embodiments, a coverage task may be refined to a plurality of successive coverage tasks in case a overhead associated with pertinent instrumentation is acceptable. In some exemplary embodiments, several coverage tasks may be replaced by a predecessor coverage task to reduce such overhead.

In step 470 a determination may be made whether additional substations or other modification in the set of coverage tasks may be performed. In case additional substitution may be performed, steps 450 and 460 may be performed iteratively. Otherwise, step 410 may be performed in respect to the modified set of coverage tasks, as provided in response to the performance of steps 450 and 460.

In some exemplary embodiments of the disclosed subject matter, coverage may be determined in respect to a device, such as implemented in software, firmware, hardware, combination thereof or the like. The device may be a computer program, a source code representation of a software, an executable, a circuit design associated with an HDL representation or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a computerized environment for determining coverage of testing in respect to a device, the device is associated with a set of coverage tasks and a coverage task hierarchy, the method comprising:

obtaining a plurality of coverage tasks of the set of coverage tasks, wherein the set of coverage tasks are a set of code coverage tasks; the plurality of coverage tasks comprises a first coverage task and a second coverage task, the first coverage task and the second coverage task are associated with different hierarchies of the coverage task hierarchy;

modifying the device to indicate coverage of the plurality of coverage tasks by a test; and determining coverage by the test of the device of the plurality of coverage tasks;

the coverage task hierarchy is a code coverage task hierarchy, wherein the coverage task hierarchy is based on a representation of the device selected from the group consisting of a syntactic representation of the device, a call graph, and an object hierarchy, and whereby the device is transformed to indicate coverage of at least the first coverage task and the second coverage task.

2. The method of claim 1 further comprising determining a second plurality of coverage tasks based on a coverage determined by said determining coverage.

3. The method of claim 2, wherein said determining the second plurality of coverage tasks comprises:

selecting a coverage task of the plurality of coverage tasks, the coverage task is associated with a plurality of coverage sub-tasks based on the coverage task hierarchy; and replacing the coverage task of the plurality of coverage tasks by a portion of the plurality of sub-tasks.

4. The method of claim 3, wherein said modifying the device and said determining coverage are further performed in respect to the second plurality of coverage tasks.

5. The method of claim 4, wherein said modifying the device, said determining coverage and said determining the second plurality of coverage tasks are performed more than once.

6. The method of claim 5, wherein said determining the second plurality is performed in respect to a predetermined hierarchy traversal method.

7. The method of claim 1, wherein said modifying the device comprises injecting the device with an at least one instruction.

8. The method of claim 1, wherein said determining coverage comprises executing a plurality of tests in respect to the modified device.

9. A computerized apparatus for determining coverage of testing in respect to a device, the device is associated with a set of coverage tasks and a coverage task hierarchy, the computerized apparatus having a processor, the computerized apparatus comprising:

a receiver configured to receive a plurality of coverage tasks of the set of coverage tasks, wherein the set of coverage tasks are a set of code coverage tasks; the plurality of coverage tasks comprises a first coverage task and a second coverage task, the first coverage task and the second coverage task are associated with different hierarchies of the coverage task hierarchy; and a coverage determinator configured to determine coverage by a test of the device of the plurality of coverage tasks received by said receiver, the coverage task hierarchy is a code coverage task hierarchy, wherein the coverage task hierarchy is based on a representation of the device selected from the group consisting of a syntactic representation of the device, a call graph, and an object hierarchy.

10. The computerized apparatus of claim 9, wherein said coverage determinator comprises an instrumentation module configured to inject at least one instruction to the device, the at least one instruction is configured to indicate coverage of the plurality of coverage tasks.

11. The computerized apparatus of claim 10 further comprising a coverage tasks determinator configured to determine a second plurality of coverage tasks, based upon the determination by said coverage determinator.

12. The computerized apparatus of claim 11, wherein said coverage determinator is further configured to determine coverage in respect to the second plurality of coverage tasks.

13. The computerized apparatus of claim 11:

wherein the plurality of coverage tasks comprises a coverage task, the coverage task is associated with a plurality of coverage sub-tasks based on the coverage task hierarchy; and wherein said coverage tasks determinator is configured to replace the coverage task of the plurality of coverage tasks by a portion of the plurality of sub-tasks.

14. The computerized apparatus of claim 11 further comprising a hierarchy traversal module.

15. The computerized apparatus of claim 14, wherein said hierarchy traversal module is selected from the group consisting of a Depth-First Search module and a Breadth-First Search module.

16. The computerized apparatus of claim 11 further comprising a test initiation module configured to initiate a test in respect to the modified device determined by said instrumentation module.

17. The computerized apparatus of claim 9 further comprising an output module configured to provide indication of the determination of said coverage determinator.

18. The computerized apparatus of claim 9 further comprising an initial coverage tasks determinator; and wherein said receiver is configured to receive the plurality of coverage tasks from said initial coverage tasks determinator.

19. The computerized apparatus of claim 9, wherein the coverage task hierarchy is determined by code coverage metrics.

20. The computerized apparatus of claim 9, wherein the code coverage task hierarchy comprises a function coverage task and statement coverage task.

21. A computer program product for determining coverage of testing in respect to a device, the device is associated with a set of coverage tasks and a coverage task hierarchy, the product comprising:

a non-transitory computer readable medium;

a first program instruction for obtaining a plurality of coverage tasks of the set of coverage tasks, wherein the set of coverage tasks are a set of code coverage tasks; the plurality of coverage tasks comprises a first coverage task and a second coverage task, the first coverage task and the second coverage task are associated with different hierarchies of the coverage task hierarchy;

a second program instruction for modifying the device to indicate coverage of the plurality of coverage tasks by a test;

a third program instruction for determining coverage by the test of the device of the plurality of coverage tasks, the coverage task hierarchy is a code coverage task hierarchy, wherein the coverage task hierarchy is based on a representation of the device selected from the group consisting of a syntactic representation of the device, a call graph, and an object hierarchy, and wherein said first, second and third program instructions are stored on said non-transitory computer readable medium.

* * * * *